May 27, 1930. P. SCHÜNEMANN 1,760,174
ELECTROMAGNETICALLY OPERATED FRICTION COUPLING
Filed March 3, 1927
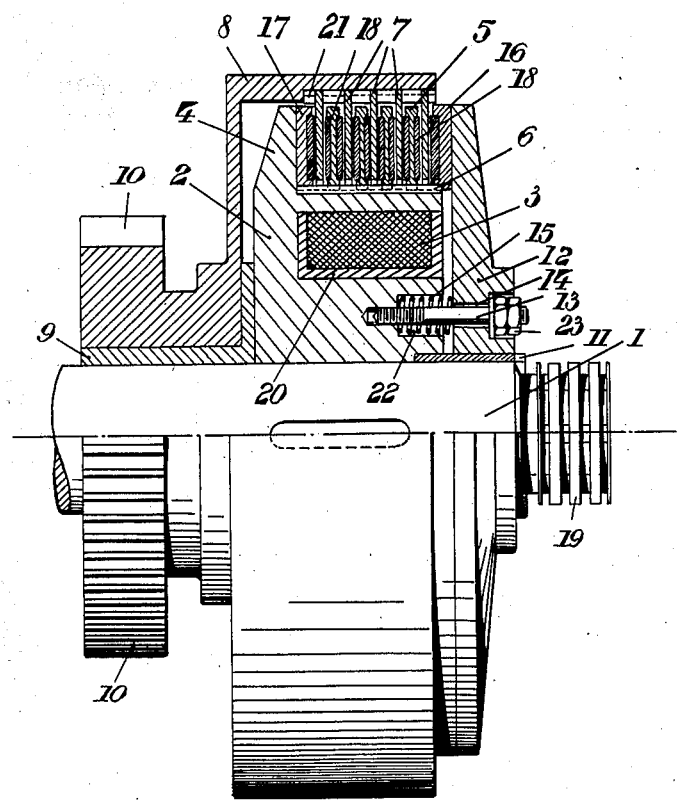
Inventor:
Paul Schünemann,
By his Att'y, Harold D. Penney.

Patented May 27, 1930

1,760,174

UNITED STATES PATENT OFFICE

PAUL SCHÜNEMANN, OF EISENACH, GERMANY, ASSIGNOR TO MAGNET-WERK G. M. B. H. EISENACH SPEZIALFABRIK FÜR ELEKTROMAGNET-APPARATE, OF EISENACH, GERMANY

ELECTROMAGNETICALLY-OPERATED FRICTION COUPLING

Application filed March 3, 1927, Serial No. 172,539, and in Germany January 28, 1927.

My invention relates to improvements in electromagnetically operated friction couplings, and more particularly in couplings of the type in which a group of discs carried by the magnet cooperates with discs connected with a bell-shaped body surrounding the said magnet and discs, the said discs being adapted to be forced into frictional engagement by means of an armature in the form of a disk. In couplings of this type such as are now in use the bell-shaped body encloses the groups of discs, a part of the magnet body, and the armature. Therefore, the inner parts of the coupling are not easily accessible, and the testing and adjusting of the coupling is exceedingly difficult, and dismounting of the parts takes much time. The object of the improvements is to provide a coupling of this type, in which the parts of the coupling are readily accessible, and with this object in view my invention consists in providing a coupling in which the bell-shaped body encloses the magnet and the discs from the side opposite to the armature, so that the armature is located outside the said bell-shaped body, the springs tending to retract the armature from the magnet being supported on the magnet body. Thus the armature can be readily adjusted relatively to the magnet and the groups of discs and it can be readily dismounted, so that the inner parts of the coupling are readily accessible, and the field coil and the discs can be readily removed from the coupling and, if necessary, replaced by other parts.

For the purpose of explaining the invention an example embodying the same has been illustrated in the accompanying drawing showing an elevation of the coupling partly in section.

In the example shown in the drawing my improved coupling comprises a coupling member 2 secured to the end of a shaft 1, the said coupling member providing the magnet core. In an annular recess 20 of the magnet core a field winding 3 is enclosed, which is adapted to be energized from slip rings 19 mounted on the shaft 1. At one side the core 2 is provided with a flange 4, and in the circumferential recess thus provided discs 5 are located, which are formed at their inner circumferences with recesses engaged by ribs 6 formed on the core 2. Thus the discs 5 are shiftable relatively to the core 2 in axial direction, but they are not rotatable relatively thereto. The other coupling member consists of a bell-shaped housing 8 rotatably mounted on the shaft 1 through the intermediary of a bushing 9, the said bell-shaped member enclosing the magnet core 2 and the discs 5 thereof. On ribs 21 provided internally of the flange of the member 8 discs 7 are axially shiftable but non-rotatable, which discs cooperate with the discs 5. As shown the groups of discs 5 and 7 are confined between rings 16 and 17 of non-magnetic material, the said rings having the function as far as possible to prevent the passage of the lines of force of the magnet through the discs. The member 8 is made integral with a gear wheel 10.

On the outer end of the shaft 1 an armature in the form of a disk 12 is axially shiftable, the said disk being mounted on a bushing 11. The outward movement of the said disk is prevented by means of bolts 13 screwing in the magnet core 2 and passed through bores 14 of the disk, the said bolts being preferably uniformly distributed concentrically of the disk. In cylindrical sockets 22 coiled springs 15 are located which bear with their opposite ends respectively on the magnet core 2 and the inner face of the disk 12, and which tend to force the armature outwardly and away from the magnet core 2 and the discs 5, 7, nuts 23 being provided on the bolts 13 for limiting the outward movement of the armature. The armature bears on the ring 16 of non-magnetic material, and when attracted by the magnet, it forces the said ring inwardly thus pressing the discs into frictional engagement with one another. The outer end of the shaft 1 and the bushing 11 supported by it form a projection of the magnet body. The exterior diameter of said projection is larger than that of the slip rings 19 so that the armature might be removed from the coupling without removing even the slip rings from the shaft on which the magnet body is fixed.

In the construction shown in the figure the discs 7 connected with the bell-shaped member 8 consist of steel rings, while the discs 5 carried by the magnet core consist of steel rings having a suitable coating on both sides such for example as asbestos impregnated for example with an artificial resin such as bakelite and hardened after impregnation.

For throwing the coupling into operation the winding 3 is energized, so that the magnet core 2 attracts the armature 12 thus compressing the groups of discs 5 and 7 against the action of the springs 15. Thereby the bell-shaped member 8 is frictionally coupled with the core 2 and the shaft 1. All the movements and the action of the forces connected therewith take place exclusively between the armature 12 and the core 2. The momentum is transmitted exclusively from the core 2 through the groups of discs 5 and 7 and to the bell-shaped body 8, and from the latter directly to the gear wheel 10.

If it is desired to inspect the coupling, the nuts 23 are unscrewed, and the armature disk 12 is removed, whereupon access can be had to the winding 3 and the discs 5, 7. Further, the armature disk can be readily adjusted relatively to the core.

While in describing the invention reference has been made to a particular example embodying the same I wish it to be understood that my invention is not limited to the construction shown in the drawing, and that various changes may be made in the general arrangement of the apparatus and the construction of its parts without departing from the invention.

I claim:

1. An electromagnetically operated friction coupling, comprising a shaft, two coupling members, one fixed to said shaft, two groups of discs mounted one on each of said coupling members, a magnet-winding within said coupling member and slip rings connected therewith, a single disc-shaped armature located at the end of said coupling member bearing said magnet winding and at the side opposite to the other coupling member, said armature being shiftable on a projection of the coupling member bearing the magnet winding, the diameter of said projection being larger than that of the slip rings.

2. An electromagnetically operated friction coupling, comprising a shaft, a bell-shaped body loosely mounted on said shaft, a magnet body and cooperating slip rings fixed to said shaft, two groups of friction members disposed between said bell-shaped body and said magnet body, a disc-shaped armature as a whole shiftable on a projection of the magnet body, the diameter of said projection being larger than that of the slip rings.

3. An electromagnetically operated friction coupling, comprising a shaft, a bell-shaped body loosely mounted on said shaft, a magnet body and cooperating slip rings fixed to said shaft, two groups of friction members disposed between said bell-shaped body and said magnet body, a disc-shaped armature as a whole shiftable on a projection of the magnet body, the diameter of said projection being larger than that of the slip rings, and springs mounted independently of said bell-shaped body and tending to separate said armature and said magnet body from each other.

4. In an electromagnetically operated friction coupling, a shaft having a free end portion, a coupling member of magnetic material fixed to said shaft, a rotary magnet body containing an exciting coil, fixed to said coupling member, an armature located on one side of said magnet body and adapted to cooperate with said magnet body, said armature being axially shiftable on said free end portion of said shaft so that it may be withdrawn from said shaft, a second coupling member located on the other side of said magnet body and rotatably mounted on said shaft, said second coupling member being formed with a flange embracing said first-named coupling member, two groups of friction discs each comprising a plurality of such discs, one of said groups being supported by said magnet body, the other one being supported by said flange, and means to drive said shaft from the side opposite to said free end portion.

In testimony whereof I affix my signature.

PAUL SCHÜNEMANN.